(No Model.)
H. E. RIDER & J. HENCKEN.
ELECTRIC LIGHTER.
No. 551,451. Patented Dec. 17, 1895.
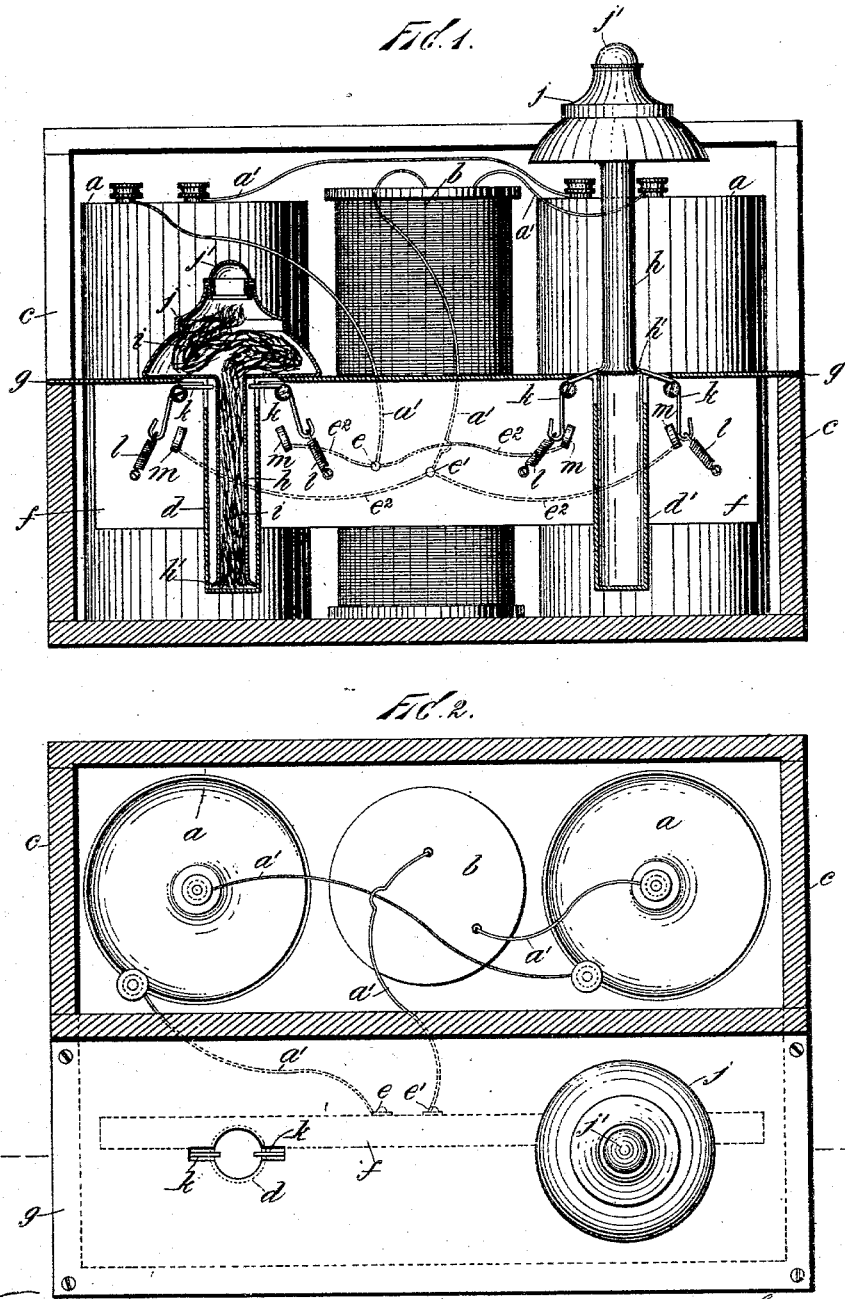
Witnesses:
John Buckler,
E. M. Taylor.
Inventors.
Herbert E. Rider
John Hencken
By Redding & Kiddle
Attorneys.

UNITED STATES PATENT OFFICE.

HERBERT E. RIDER AND JOHN HENCKEN, OF NEW YORK, N. Y., ASSIGNORS TO ROBERT W. INMAN, OF SAME PLACE.

ELECTRIC LIGHTER.

SPECIFICATION forming part of Letters Patent No. 551,451, dated December 17, 1895.

Application filed November 10, 1894. Serial No. 528,367. (No model.)

*To all whom it may concern:*

Be it known that we, HERBERT E. RIDER and JOHN HENCKEN, citizens of the United States, and residents of the city and county of New York, State of New York, have invented certain new and useful Improvements in Electric Lighters, of which the following is a specification, reference being had to the accompanying drawings, forming part hereof.

This invention relates to devices for lighting or igniting by means of an electric current, and the apparatus hereinafter described embodying this invention is particularly designed for use as a cigar-lighter.

According to our invention a torch composed of or containing inflammable material or adapted to be made inflammable temporarily or otherwise is arranged within a suitable receptacle, and a spark-forming device is arranged in proximity to said receptacle so as to be brought into action to ignite said torch by the withdrawal of the torch from the receptacle, and thus in the single and simple operation of removing the torch from its receptacle the torch will be ignited.

Our invention also includes certain improvements in the construction of torch and of the spark-forming devices and of other parts, all of which will be hereinafter particularly described and claimed.

The accompanying drawings illustrate an embodiment of our invention.

Figure 1 is a front elevation of the invention, cut in section on the line 1 1 of Fig. 2, and with the upper front portion of the casing removed to more clearly show the construction. Fig. 2 is a plan view with the extreme upper part of the casing cut in section. Fig. 3 is an enlarged detail perspective view of one of the yielding spark-forming fingers.

In the embodiment of our invention herein shown suitable devices for generating the electric current, such as the electric batteries $a\ a$, and a suitable device for intensifying the electric current, such as the spark-coil $b$, are shown as arranged within a box or casing $c$, which box or casing also supports and incloses the spark-forming devices and other parts.

Any suitable electric-current-generating devices may be employed which would cause an electric current to flow through the spark-forming devices of such a character as to cause the ignition of the torches.

The details of the construction of the electric batteries $a$, which may be of the ordinary dry-battery type, and of the spark-coil $b$ are not herein particularly shown or described, as such devices are well known. Suitable conducting-wires $a'$ are shown whereby the electric current is led in series through the batteries and through the spark-forming coil to the screws or binding-posts $e\ e'$. From these binding-posts $e\ e'$ the electric current is conveyed to the spark-forming devices in the manner to be hereinafter explained. The binding-posts $e\ e'$ are shown as secured upon a vertically-arranged plate $f$, preferably of insulating material, and this plate $f$ is shown as attached to a top plate $g$, and the receptacles $d\ d$ are shown as forming part of said top plate $g$ or may be secured thereto or otherwise properly supported. These receptacles $d\ d$ are shown as extending downward from the top plate $g$ and closed at their lower ends. Two of these receptacles are shown, and two torches are shown arranged to be held within these receptacles; but it is of course evident that any desired number of torches or receptacles may be employed.

As shown, the receptacles $d\ d'$ are not designed to act as reservoirs of inflammable material, although it is of course evident that this invention may be partly embodied in a construction in which the receptacles constitute such reservoirs, and the reservoir for the inflammable material in the apparatus shown embodying our entire invention is formed within and as part of the torch itself, and the torch comprises a hollow tube $h$, adapted to fit within a receptacle $d$ and provided at its lower end with a flaring ring or enlargement or contact device $h'$ and open at its lower end for the emergence of a suitable wick $i$, and the torch at its upper part above the tube $h$ is of considerable larger dimensions, so as to form a reservoir $j$, which is shown as a hollow shell contiguous with the tube $h$ and which is adapted to contain a considerable quantity of wick material, so as to permit of the retention of a considerable amount of inflammable fluid, such as alcohol, with which said wick material may be saturated. This wick is preferably composed of asbestos, so as to be non-consuming. The depth of the receptacle relatively to the length of the tube $h$ is preferably so adjusted that when the torch is in place within the receptacle the wick will come in contact with the bottom of the receptacle, thereby insuring the complete extinguishment of the torch and preventing evaporation of the inflammable fluid. The hollow reservoir $j$ is shown as provided with a removable cap $j'$ at its upper end, which may be screwed or otherwise tightly fitted therein and may be removed for renewing the charge of inflammable material of the wick. The reservoir $j$ and its cap $j'$ constitute the handle of the torch, and are of such configuration that they may be grasped by the user for the purpose of removing the torch from the receptacle and using the torch and returning it to the receptacle. The tube $h$, contact device $h'$, and reservoir $j$ are shown as of one piece, which may be of a suitable electric conducting material; but it is of course evident that these parts may be made up of several separate pieces and that the contact device is the only part that is necessarily an electric conductor. This contact device may therefore be a separate ring of conductive material and may be insulated from the other parts of the torch or the other parts of the torch may be of insulating material; and various modifications may be made in the construction of the torch without departing from our invention.

The spark-forming devices are shown as yielding fingers $k$, arranged so as to project into slots formed at the mouths of the receptacles, and in the embodiment of our entire invention these slots are continued into the top plate $g$, so that the yielding fingers may rise above the surface of the top plate $g$. One of the yielding fingers is particularly shown in Fig. 3, and as shown consists of a substantially horizontal member or arm, the outer end of which constitutes the spark-forming point, and of a downwardly-extending member or arm and of a coiled portion at the pivotal point, whereby a considerable degree of flexibility is imparted to the finger. It is of course evident that the construction of this finger may be modified without departing from our invention. The yielding fingers $k$ are shown as pivoted upon pins or screws projecting from the plate $f$, and to the downwardly-extending arms of the fingers are secured springs $l\ l$, and the tension of these springs $l\ l$ tends to hold the yielding fingers in the positions shown in connection with the left-hand receptacle $d$ of Fig. 1. Contact-stops $m\ m$ or other suitable current terminals are secured to the plate $f$ in such positions that the lower members of the yielding fingers $k$ are normally out of contact with said plates; but these plates are arranged in the paths of the lower members of the fingers, and the fingers are brought into contact with these plates by the operation of removing the torch from the receptacle, as will be hereinafter explained. The stops $m$ are suitably connected to the source of electric current, and as shown the two plates of each spark-forming device are separately connected to the two binding-posts $e$ and $e'$, by wires $e^2\ e^2$.

As will be seen, the yielding fingers $k\ k$ are normally out of electric circuit and the circuit is normally broken. When a torch is lifted upward in the operation of withdrawing it from a receptacle $d$, the contact-ring $h'$ of the torch comes in contact with the yielding fingers $k\ k$ and moves these yielding fingers upward, and thus brings their lower ends into contact with the stops $m\ m$ respectively, and the parts assume the position shown in connection with the right-hand receptacle in Fig. 1, with the electric current flowing through the yielding fingers and through the lower end of the torch and the yielding fingers are lifted upward so as to be above the top plate $g$. The continued upward movement of the torch will now cause the contact device $h'$ to be moved away from the yielding fingers, and thus the current after having been caused to flow through a closed circuit will be broken either at one or both points of contact, and this breaking of the current will cause an electric spark which will ignite the wick $i$ of the torch.

In the construction shown embodying our entire invention, in which the yielding fingers are moved upward above the top plate $g$, this contact-breaking and spark-forming operation will take place above the mouth of the receptacle, and thus there will be no fear of smothering or extinguishing the flame ignited by the electric spark. The torch being now ignited may be used for any desired purpose, and as is evident will remain ignited for a considerable period of time, so that it may be used for igniting the gas or lamps in a room or for other purposes, or the torch may be used for the purpose of lighting a cigar and promptly returned to its receptacle. The flame of the torch will be smothered or extinguished by returning it to its receptacle. During the operation of returning the torch to the receptacle the contact device $h'$ depresses the yielding fingers sufficiently to pass below the fingers; but the only effect of this movement of the fingers is to take them farther away from the contact-stops $m\ m$, and the fingers are brought back again to normal positions as soon as the contact device $h'$ has passed below and released them.

The operation of withdrawing the torch from its receptacle and thereby igniting it, and using it for any desired purpose, and returning it to its receptacle and thereby extinguishing it, may be repeated as often as desired, so long as the torch is supplied with inflammable material and the electric-current-generating devices produce a sufficient spark.

It will be noted that there is no waste of electric current in the lighter embodying our invention, as the yielding fingers are normally out of contact with the terminals of the electric circuit; also that the apparatus is of simple and inexpensive construction, and positive and reliable in operation, and not liable to derangement.

It is evident that various modifications may be made in the construction above particularly described without departing from our invention; also that parts of our invention may be used separately or in combination with other parts of different construction. We do not therefore limit ourselves to such particular construction; but

What we claim, and desire to secure by Letters Patent, is—

1. The combination with a torch, of a receptacle for the same, and an electric spark forming device, said device being actuated by the withdrawal of the torch to form a spark, but being unaffected by restoring the torch.

2. The combination with a torch having a contact, of a receptacle for the same, and an electric spark forming device, said device being arranged so that the contact on the torch will actuate it to form a spark upon the withdrawal of the torch, but which upon restoring the torch will not be actuated to form a spark.

3. The combination with a torch having a contact, of a receptacle for the same, a moving spark forming device and a stop constituting the terminal of an electric circuit, the spark forming device being normally out of contact with said stop, so that upon withdrawing the torch the spark forming device is made to contact with the stop, but which upon restoring the torch to place will move away from the stop.

4. The combination with a torch containing a contact device, of a receptacle for the same, two yielding spark forming fingers, and two suitable contact stops forming terminals of an electric circuit, said yielding fingers being normally out of contact with said stops, and being arranged in the path of said contact device of the torch so that in the withdrawal of said torch from the receptacle said fingers are brought into contact with said stops and make and break contact with the contact device of the torch, substantially as set forth.

5. The combination with a torch containing a contact device, of a receptacle inclosing the same, a yielding spark forming device arranged at the mouth of said receptacle in the path of and arranged to be struck by the contact device of the torch, whereby on the withdrawal of said torch from the receptacle the spark forming device is caused to yield outwardly beyond said receptacle, and the spark will be formed outside of said receptacle; substantially as set forth.

6. The combination with a torch containing a contact device, of a receptacle for the same, and two yielding spark forming fingers arranged at the mouth of said receptacle and in the path of said contact device of the torch so that in the withdrawal of said torch from the receptacle the spark forming ends of the fingers are caused to protrude beyond said receptacle, two contact stops forming terminals of an electric circuit, said fingers being normally out of contact with said stops, but arranged so as to be brought into contact with said stops by the removal of the torch from the receptacle, substantially as set forth.

7. The combination with a torch containing a contact device, of two yielding spark forming fingers and two contact stops constituting terminals of an electric circuit, said fingers being normally out of contact with said stops, and said fingers being arranged so as to come in contact with the contact device of the torch and to be brought into contact with the stops by the movement of said torch and to break contact with said contact device on the further movement of the torch thereby igniting the torch, substantially as set forth.

8. The combination with a hollow torch containing a reservoir in its upper part and a wick extending downward through the torch and emerging at the lower end of said torch, of a closed receptacle for the wick end of the torch, a contact device at the mouth of said torch, and spark forming fingers extending into said receptacle and arranged to make and break contact with said contact device and thereby ignite said torch, substantially as set forth.

9. The combination with a torch containing a projecting contact device at the lower end thereof, of the receptacle $d$ for said torch, and the plate $g$, said receptacle and plate having contiguous slots therein, spring fingers $k$ extending into said receptacle through such slots, and means for conveying an electric current to said fingers, substantially as set forth.

10. The combination with a torch containing a projecting contact device at the lower end thereof, of the receptacle $d$ for said torch, and the plate $g$, said receptacle and plate having contiguous slots therein, the spring fingers $k$ extending into said receptacle through such slots, the springs $l\ l$, respectively connected to said fingers $k$, and the contact stops $m\ m$ forming terminals of an electric circuit, substantially as set forth.

11. The combination of a torch containing a reservoir in its upper part and a wick extending downward through the torch and emerging at the lower end of said torch and said torch having a projecting contact device at the lower end thereof, with the receptacle $d$ for said torch and the plate $g$, said receptacle and plate having contiguous slots therein, the spring fingers $k$ extending into said receptacle through such slots, the springs $l\,l$, respectively connected to said fingers $k$, and the contact stops $m\,m$, forming terminals of an electric circuit, substantially as set forth.

This specification signed and witnessed this 30th day of October, 1894.

HERBERT E. RIDER.
JOHN HENCKEN.

Witnesses:
HENRY D. WILLIAMS,
F. M. EGGLESTON.